2,951,801

NEUTRONIC REACTION FUEL

David W. Lillie, Schenectady, N.Y., assignor to General Electric Company, a corporation of New York No Drawing. Filed July 11, 1958, Ser. No. 747,817

14 Claims. (Cl. 204—193.2)

This invention relates to nuclear fission and more particularly to neutronically reactive components comprising alloys of the 233 and 235 isotopes of uranium.

This application is a continuation-in-part of my copending application Serial No. 652,335, filed April 12, 1957, now abandoned, and assigned to the assignee of this application.

As is well known, isotopes $U^{235}$ and $U^{233}$ may be fissioned by neutron bombardment to produce fission neutrons, beta and gamma radiations, and lighter elements accompanied by the release of considerable heat. When a sufficiently large mass of the uranium isotopes are exposed to such a bombardment, a self-sustaining chain reaction occurs in the system whereby the ratio of the number of neutrons produced in one generation by the fissions to the original number of neutrons initiating the fissions is greater than unity after all neutron losses are deducted. This ratio, which for convenience may be referred to as $k$, is preferably maintained at a value lying between 1.00 and 1.10. Control of this ratio may be accomplished by selectively increasing or decreasing the magnitude of the neutrons lost from the reaction. This has been previously accomplished by forming a uranium isotope mass into many discrete "fuel" elements disposed in a lattice-like array within the structure of the reactor and introducing a controllable amount of materials capable of capturing or absorbing relatively high numbers of neutrons into spaces between some or all of the fuel elements. As the neutron absorbing material is gradually withdrawn from the reactor, greater numbers of neutrons are free to enter into the reaction and a point during the withdrawal is reached where the reaction becomes self-sustaining. At this point, the ratio $k$ is greater than unity. If the withdrawal is stopped when the instantaneous value of $k$ is slightly greater than unity, the reaction is self-sustaining but only for a limited time because as the reaction proceeds, the amount of uranium is gradually depleted and the fission products of the reaction act to capture neutrons. This results in a gradual decrease in the value of $k$ until the reaction stops. It will be seen that for a given reactor of this type containing a given amount of uranium fuel, constant regulation of the neutron capturing control means is required in order to maintain the rate of the self-sustaining reaction within the desired limits. It would be desirable to reduce the amount of external control required to regulate the rate of reaction.

It is, therefore, a principle object of this invention to provide reactor fuel elements having constituents therein which have neutron capturing characteristics which change at a more or less constant rate during the reaction so that the $k$ value of the reactor system remains virtually constant over a relatively long period of time without changing the external control characteristics of the system. Other and different objects of this invention will become apparent to those skilled in the art during the detailed disclosure which follows.

Briefly stated, in accordance with one aspect of my invention, I provide reactor fuel elements consisting essentially of an alloy of uranium 233, uranium 235 and mixtures thereof and, a metal having a low neutron capture cross-section, which alloy provides a matrix for a finely divided even dispersion of a material having a relatively high neutron capture cross section but which, upon capturing neutrons during the fission reaction, undergoes a transmutation to a different material having a much lower neutron capture cross section.

More specifically, it is proposed that nuclear reactor fuel elements be constructed from alloys of uranium 233, uranium 235 and mixtures thereof, and a metal, such as aluminum or zirconium, containing a fine, even dispersion of boron. As these fuel elements are consumed in the nuclear reaction, the boron in the particles which have a very high neutron capture cross section, i.e., a high absorption characteristic for neutrons, are gradually transmuted to lithium which has a much lower neutron capture cross section according to the following indicated reaction:

$$B^{10}+n \to Li^7+He^4+Q$$ 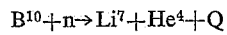

In the reaction indicated above, $B^{10}$ represents the boron isotope having an atomic weight of 10, $n$ represents a neutron, $Li^7$ represents the lithium isotope having an atomic weight of 7, $He^4$ represents helium and $Q$ represents evolved energy, more specifically, 3.0 million electron volts. As is well known, the neutron capture cross section of natural boron is about 750 barns, and that of boron 10 about 3990 barns, while the neutron capture cross section of lithium 7 is about 33 millibarns. Since the rate of transmutation of boron 10 to lithium 7 is proportional to the rate of the fission reaction, it will be seen that as the uranium is consumed by the reaction, the number of neutrons removed from the fission reaction by the boron is proportionally reduced. The alloying metal, i.e., either aluminum or zirconium, serves a two-fold purpose in that it acts as a relatively inert diluent for the uranium and also provides a means for reducing the rate of corrosion of the uranium at elevated temperatures. In practice, it may be desirable to additionally clad the surfaces of the reactor fuel element with a relatively thin layer of the pure alloy metal in order to better control corrosion.

It is contemplated that reactor fuel elements constructed according to my invention comprise suitably formed and dimensioned bodies consisting essentially of up to 50 percent by weight and preferably from about 10 to 23 percent by weight of a fissionable isotope of uranium, i.e., either uranium 233 or uranium 235, a small but effective amount of boron 10 which may comprise up to about 0.2 percent by weight of boron 10 and preferably from about 0.002 to 0.13 percent by weight of boron 10, and the balance being a metal selected from the group consisting of aluminum and zirconium. In view of the fact that natural boron contains about 18.8 percent by weight of boron 10, the boron 10 additions may be accomplished by additions of natural boron or natural boron which is either enriched with boron 10 or which contains lesser amounts of boron 10. Since the other major isotope of boron, boron 11, has a neutron capture cross-section of less than 0.05 barn, it may be desirable to utilize a natural boron which has been enriched with a predetermined amount of boron 11 so as to effectively reduce the boron 10 content by a known amount. This procedure may be desirable when alloys containing lesser amounts of boron 10 are to be made, since accurate analysis of very low boron contents are difficult to readily achieve in such alloys.

It has been found that an adequately even dispersion of boron cannot be achieved by adding boron to the molten alloys in the form of a master alloy. In a reactor fuel element in which the boron is not substantially evenly distributed throughout the fuel element, hot spots tend to develop in zones having little or no boron causing damage to the element. Reactor fuel elements having a satisfactory distribution of boron particles may be prepared according to my invention in the following manner.

An appropriate quantity of aluminum or zirconium is melted and a gaseous halide of boron is bubbed through the bath. Boron trichloride or boron tribromide are preferably employed. These halides of boron react with the molten metal in the bath to form a volatile metal halide which rises to the surface of the bath and is dissipated, and a fine dispersion of boron is distributed through the bath. It will be understood that the term "uranium" includes natural uranium which contains about 0.7 percent by weight uranium 235, and natural uranium enriched by the addition of either uranium 235 or uranium 233 thereto. In any event, the uranium content of these alloys should contain from at least about 5 percent up to 50 percent by weight and preferably from about 10 percent to 23 percent by weight of either uranium 233 or uranium 235, and under certain circumstances particularly where natural uranium has been enriched by the addition of uranium 233, the alloy may contain from about 5 percent to 23 percent by weight of a mixture or combination of uranium 233 and uranium 235. After sufficient boron has been introduced to the molten metal bath in this manner, a predetermined amount of uranium is added to the bath, melted and alloyed with the metal therein, and the alloy cast into an appropriate mold. The casting may then be formed into the desired configuration by conventional working procedures and clad if desired.

As a specific example of the previously recited procedure, assume it is desirable to produce a one-kilogram casting containing 20 percent uranium, about 0.3 percent natural boron, and the balance substantially all pure aluminum. A charge of about 805 grams of substantially pure aluminum is melted in an induction furnace. The bath temperature is maintained at about 800° C. and boron trichloride gas is bubbed through the molten aluminum. Stoichiometrically, it would require 6.2 liters of boron trichloride at 760 millimeters of mercury pressure and 20° C. to react with about 7.5 grams of aluminum to produce 3 grams of boron, the required amount. However, I have found that the recovery of boron in this reaction, under these conditions, is usually less than 10 percent. Therefore, as much as 125 liters of boron trichloride gas at the previously recited standard conditions of temperature and pressure may be required. After the boron trichloride has been bubbled through the bath, about 200 grams of uranium is added to the molten aluminum, the temperature of the bath is increased to about 900° to 1100° C. and the uranium melted with the aluminum-boron base to form the desired alloy. The melt may then be cast into conventional molds of graphite, for example, and permitted to solidify. The casting may then be formed by conventional working procedures, such as forging or rolling, for example, into fuel elements of the desired configuration and clad with aluminum if desired.

In the practice of my invention, zirconium may be substituted for the aluminum on a straight weight basis with appropriate adjustments in melting temperatures and boron tribromide may be substituted for boron trichloride with appropriate stoichiometric adjustments if desired. Further if it is desired to clad these zirconium-uranium-boron reactor fuel elements, it is preferable that zirconium be employed as a cladding material.

In reactor fuel elements containing either aluminum or zirconium produced according to my invention, the boron content is substantially evenly distributed throughout the alloy matrix whereby undesirable hot spots are avoided during a nuclear reaction, and substantially constant $k$ value for a reactor embodying these fuel elements may be maintained over relatively long periods of time with a minimum of external control.

What I claim as new and desire to secure by Letters Patent of the United States is:

1. The method of making neutronic reactor fuel elements comprising melting a quantity of a metal selected from the group consisting of aluminum and zirconium, bubbling a gas selected from the group consisting of boron trichloride and boron tribromide through the molten metal whereby the gas is decomposed to form a dispersion of boron in the metal, alloying fissionable uranium with said molten metal to form an alloy consisting essentially of up to 0.20 percent by weight boron 10, a small but effective amount up to 50 percent by weight of fissionable material selected from the group consisting of uranium 233, uranium 235 and mixtures thereof, and the balance being substantially all of a metal selected from the group aluminum and zirconium, and casting said alloy.

2. The method recited in claim 1 in which said alloy contains from 5 to 50 percent by weight of said fissionable material.

3. The method recited in claim 1 in which said alloy contains from 10 to 23 percent by weight of said fissionable material.

4. The method recited in claim 1 in which said alloy contains from 5 to 23 percent by weight of uranium 233.

5. The method recited in claim 1 in which said alloy contains from 10 to 23 percent by weight of uranium 233.

6. The method recited in claim 1 in which said alloy contains from 5 to 23 percent by weight of uranium 235.

7. The method recited in claim 1 in which said alloy contains from 10 to 23 percent by weight of uranium 235.

8. The method recited in claim 1 in which said alloy contains from 0.002 to 0.13 percent by weight of boron 10.

9. The method recited in claim 1 in which the metal is aluminum and the gas is natural boron trichloride.

10. The method recited in claim 1 in which the metal is aluminum and the gas is natural boron tribromide.

11. The method recited in claim 1 in which the metal is zirconium and the gas is natural boron trichloride.

12. The method recited in claim 1 in which the metal is zirconium and the gas is natural boron tribromide.

13. A neutronic reactor fuel element consisting essentially of a small but effective amount up to 50 percent by weight of a fissionable material selected from the group consisting of uranium 233, uranium 235 and mixtures thereof, up to 0.20 percent by weight of boron 10 and the balance substantially all of a metal selected from the group consisting of aluminum and zirconium, said element having been formed from a casting produced by practicing the process recited in claim 1.

14. A neutronic reactor fuel element as defined in claim 13 wherein said element contains from 5 to 23 percent by weight of said fissionable material.

No references cited.